United States Patent [19]
Milton et al.

[11] Patent Number: 4,839,567
[45] Date of Patent: Jun. 13, 1989

[54] ILLUMINATED AERIAL MARKER

[76] Inventors: R. M. Milton, 5004 Fort Clark, Austin, Tex. 78745; Daniel C. Barnes, 6002 Diamond Head Dr., Austin, Tex. 78745

[21] Appl. No.: 67,367

[22] Filed: Jun. 29, 1987

Related U.S. Application Data

[63] Continuation of Ser. No. 945,398, Dec. 23, 1986.

[51] Int. Cl.⁴ .............................................. H01J 15/04
[52] U.S. Cl. ...................................... 315/344; 315/76; 315/248; 315/227 R; 313/54; 313/631
[58] Field of Search ............... 315/248, 344, 227 R, 315/76, 246; 313/54, 643, 631; 361/117, 142

[56] References Cited

U.S. PATENT DOCUMENTS

| | | | |
|---|---|---|---|
| 2,028,906 | 1/1936 | Higgins | 315/227 R |
| 2,030,491 | 2/1936 | Abadie | 313/54 |
| 2,117,544 | 3/1938 | Coustal | 315/248 |
| 2,159,937 | 5/1939 | Zworykin | 315/248 |
| 2,525,624 | 10/1950 | Stahl et al. | 315/248 |
| 2,629,839 | 2/1953 | Greenlee | 315/248 |
| 3,076,914 | 2/1963 | Meahl | 313/643 |
| 3,094,642 | 6/1963 | Duval | 313/643 |
| 3,124,712 | 3/1964 | Alexander | 315/246 |
| 4,039,894 | 8/1977 | Gardner | 315/344 |

OTHER PUBLICATIONS

Balisor and Sphere, French reference.

Primary Examiner—David K. Moore
Assistant Examiner—Michael Razavi
Attorney, Agent, or Firm—Joseph F. Long

[57] ABSTRACT

An illuminated aerial marker for a high voltage transmission line using a spherical colored opaque capacitor with neon lamps in series or series/parallel or parallel, exterior to the capacitor with one electrode of the lamps connected to the high voltage source and the other to the conductive area of the capacitor or capacitors.

5 Claims, 1 Drawing Sheet

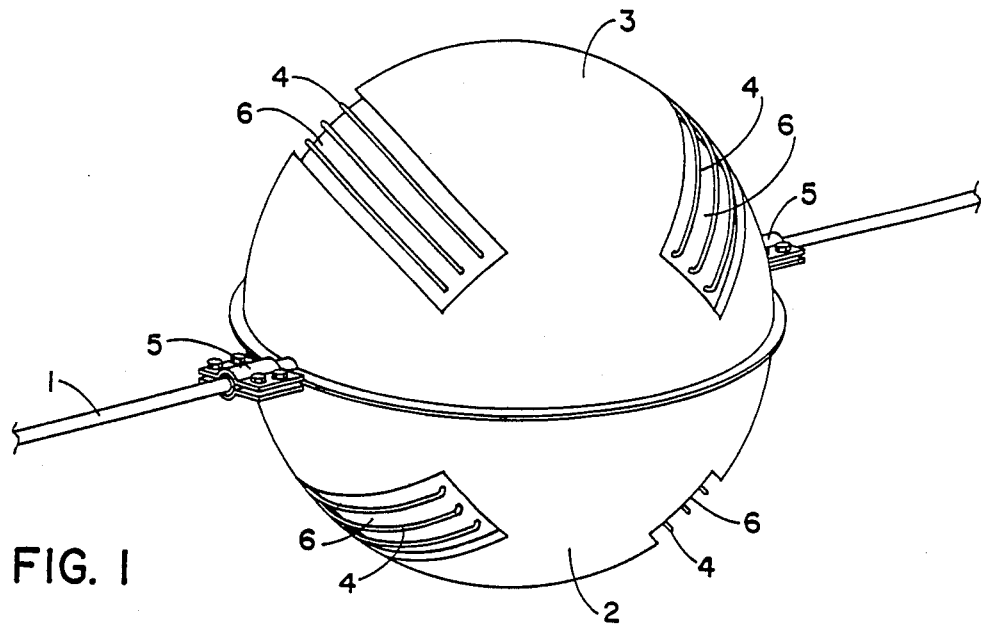
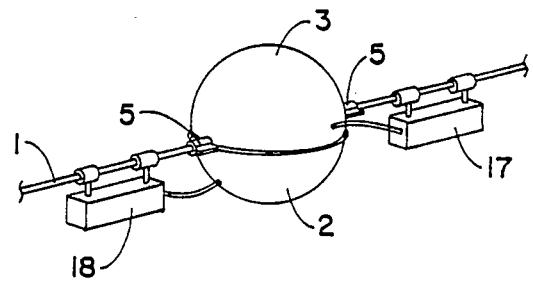
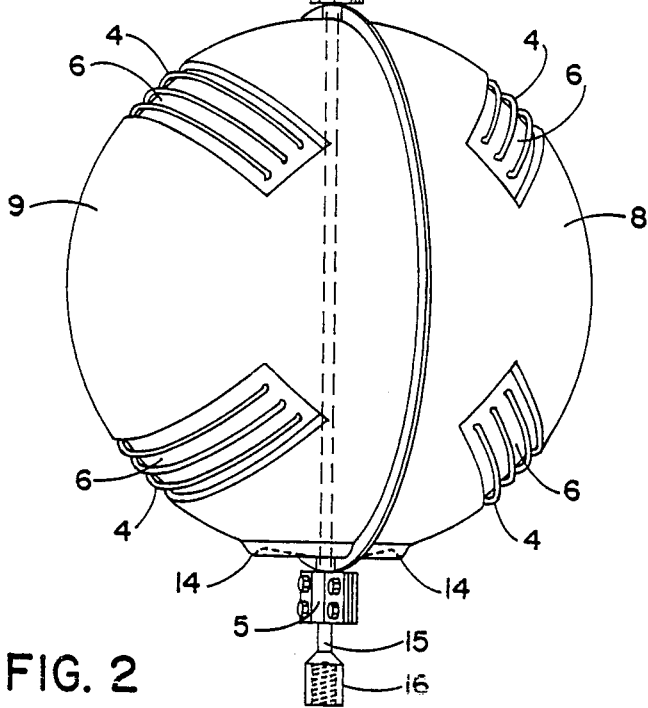

ILLUMINATED AERIAL MARKER

This is a continuation in part or my Patent pending Ser. No. 06/945,398 for an Illuminated Aerial Marker, now abandoned.

Continued development has evolved an aerial marker of improved characteristics as compared with my Patent Pending, Ser. No. 06/945,398. These characteristics and new embodiments are more fully covered in the following claims and specifications but, in brief, they revolve around the discovery of various configurations of neon lamps that may be used on the exterior of the colored spherical balls, presently required by the FAA for daytime visibility, when these spherical balls are designed to become capacitors. The length, placement, conductivity of the gas, configuration of a lamp, type of electrode, diameter of lamp tube, electrical and physical relation of lamps to each other, and how these considerations affect the capacitance of the capacitor by varying the flux and static fields when placed external to a spherical capacitor (that being the spherical ball), determine the performance of the marker ball as an illuminator. These relationships ultimately affect the brilliance of the lamp or lamps, the oscillation rate, and the brilliance or intensity of the oscillation. These mechanical, physical, and electrical arrangements are designed to offer the maximum illumination. The field created by current flow through the lamps interacts with the field of the shell changing the effective shell capacitance. The flow of electricity depends upon applied voltage and resistance in a circuit. In this case the resistance which is normally called impedance when a capacitor is in a circuit varies with current frequency and effective size of the shell capacitor. In normal use the frequency is 60 cycles and does not change appreciably. We have found that with lamps of sufficient length spread evenly over the shell of the spherical balls the field caused by instant flow of current through the lamps may effectively decrease the shell capacitor strength so as to increase impedance in the circuit so the lamps will not give sufficient illumination. On the other hand, we have found that proper placement, size and electrical hook up allows current flow through the lamps to cause sufficient light emission but the same current flow increases impedance sufficiently in the circuit so that current flow through the lamps is reduced and light emission decreases. Now this reduction in current flow through the lamps allows an instant effective increase in the spherical capacitor thereby reducing circuit impedance causing increased current flow through the lamps; therefore we have found it possible to produce an oscillating or dancing light. Other configurations of lamps allow a continuous light because there is not sufficient circuit impedance change to dim the light emission. Thus we have a unique circuit where mechanical, physical and electrical arrangements allow production of either steady or oscillating illumination. With this discovery we have achieved a unit which satisfies the Federal Aviation Administration (FAA) requirements for size, visibility, and shape for daytime visibility as well as creating an adequate illumination for nighttime visibility exceeding the requirement of conspicuity at 4000' distance. We have further discovered that insulating the device from fluid runoff and heavy drainage due to rainstorms eliminates any diminution of illumination. Currently the present marker ball tend to be destroyed by corona or arcing between the shells and high voltage line. Our electrical connection to the marker ball shell which is modified to become a capacitor is such that only a small potential difference exists between the high voltage source and the marker ball shell capacitor so that arcing between the shell and high voltage source is eliminated thus allowing for long life of the marker ball shell.

As indicated in my earlier patent in the United States many miles of high voltage transmission lines are constructed to be elevated to sufficient height, relatve to the surrounding terrain, to minimize ground vehicle contact with the line. These lines are not easily visible from the air and present a hazard to low-flying aircraft. It is common to mark these transmission lines in strategic locations, markers being spherical shaped fiber glass shells with a highly visible color to increase daytime visibility. It would, of course, be quite desireable to increase night time visibility by illumination. This illumination should be accomplished by utilizing the high voltage source in a simple easily maintained manner.

Objectives of this invention then are:

1. to increase the usefulness of this aerial safety markers by illumination 2. to provide an illuminated safety marker that may be easily installed 3. to provide a long lasting, maintenance free illuminated marker 4. to provide power to the illuminator without use of secondary power devices and without use of a transformer 5. to develop some embodiments of an illuminated aerial marker that may be attached to a high voltage transmission line without deactivation of the line 6. to provide a continuous or oscillating light as need dictates 7. to effectively eliminate corona between the ball and high voltage source and 8. to eliminate high maintenance lighting circuits.

We have now accomplished these objectives using a capacitor which may be a spherical shell with embedded conductive sections and using neon lamps external to this spherical shell. One electrode of the neon lamps connected directly to the high voltage source through a clamp. The other electrode of the neon lamp attaches to the conductive portions of the spherical shell capacitor. Our previous patent pending, Ser. No. 06/945.398 covered various illuminators with the neon lamps adjacent to the high voltage source and encased in or surrounded by a conductive screen type capacitor. We now find that a low cost spherical capacitor made by embedding strips of conductive glass or metal inside the shell of the sphere may be used to support neon lamps external to the shell, and make a marker of excellent visibility. Neon lamps closely adjacent to the outer shell of a spherical lightimpervious impervious colored capacitor 30" in diameter and with eight 27" long, 10 mm diameter lamps with 10 mm pressure neon electrically hooked in parallel and placed physically parallel at $\frac{1}{2}$" interval spacing on a spherical capacitor, will be brilliantly illuminated. This will give a highly effective oscillating light and is conspicious at 5000' to 10,000'. However ten lamps of the same construction spaced 4" apart reduces illumination to a level barely noticable at 3000'. Concentrated lamping areas improve depth perception for pilots and is preferred to having the lamps more widely spaced over the shell. This problem of critical depth perception makes this development superior to that of internal lamping of a transparent or translucent shell. In view of the lack of a federal standard, the Federal Aviation Administration has expressed interest in determining lamping selection for conspicuity for pilots. Various other gasses may be selected for lamp color depending on their application.

There are numerous variations in length of neon lamps, electrical configuration of the neon lamps and size or multiplicity of capacitors that may be tailor-made for differing voltages of the high voltage sources and to produce either steady or an oscillating or dancing light. We have outlined some of these embodiments in more detail in the following specifications and claims.

We have considered the following patents and a French device entitled "Balisors and Spheres" that are related but importantly different than our invention: U.S. Pat. No. 1,976,378; 1934; Aviation Marker; U.S. Pat. No. 2,028,906; 1936; Marker Light; U.S. Pat. No. 2,030,491; 1936; Device for Applying Luminescent Tubes to Power Transmission Lines; U.S. Pat. No. 3,124,712; 1964; Luminous High Tension Indicator;

The French device entitled "Balisors and Spheres" is aimed at fulfilling the objective of increased nighttime visibility for high voltage wires. We have attached a copy of this publication. This French device or BALISOR is quite different than our invention in at least the following important ways:

1. The BALISOR and Sphere system uses a normal sphere for daytime visibility and a BALISOR or lighted neon tube located close to the sphere for night time visibility. The BALISOR is a neon tube encased inside a transparent tube filled with conductive fluid with one electrode of the neon tube connected to the high voltage source and the other to a rod of a precise and considerable length, supported parallel to the high voltage source.

2. The BALISOR has only one neon tube so the redundancy present in our multiple tube invention is not present.

3. The BALISOR operates in radio frequency region so that shielding is required whereas our invention is capacitance induced light with no radio frequency emissions.

4. In our invention the oscillating field of the 60 cycle alternating current high voltage line serves to excite the neon gas thereby facilitating the light emission, whereas the insulated conductive fluid around the neon tube in the BALISOR would prevent this excitation.

5. In our invention the sphere diameter may be varied only a small amount to increase light emitted from the tubes. For example, increasing the sphere diameter from 15" to 17" gives approx. 50% more light on the same voltage line. Thus we have the possibility of varying sphere diameter and neon tube configuration to give optimum illumination on differing voltage lines. This flexibility is not easily accomplished with the BALISOR.

6. Our invention allows for a variety of physical and electrical configurations of the neon light or lights or other gas filled lamps for a variety of navigational uses.

7. Redundancy of the lights in our invention increase the likelihood of longer maintenance free operation.

8. Some embodiments of our invention may be installed without deactivation of the high voltage source.

9. Further, we may use reflective tape strips or sections embedded within the marker to increase both day-time and night-time visibility.

U.S. Pat. No. 3,124,712, a Luminous High Tension Indicator, uses a high voltage source to operate a neon lamp but has important differences from our invention, such as:

a. use of a light pervious rather than opaque enclosure with the enclosure forming the capacitor, use of a single tube and use of a rectifier to cause flashing of the single tube. This device would not fill the objectives of a simple illuminator to be used with the preferred spherical shaped colored opaque ball prescribed by the FAA for best day-time visiblity, while our invention does so. The use of a conductive screen type enclosure limits emissions of the light from the marker.

b. our invention secures a strobing light when desired by proper electrical and physical configuration of the long life neon tubes.

c. use of a multiplicity of tubes or lamps in our invention, gives increased illumination as well as allowing for failure of one or more tubes while still maintaining illumination.

Our invention recognizes that placing the neon or gas filled lamps closely adjacent to an active high voltage source allows operation of neon lamps in parallel. Laboratory tests have shown that a plurality of lamps in parallel must be in a high voltage field as well as having a voltage applied across the lamps for the lamps to oscillate. Further we have shown that lamps must be in the field of a high voltage capacitor as well as having voltage applied across the lamps for the lamps to oscillate. Further, we have shown that lamps must be properly configured on a spherical shell to reduce field cancellation effects to achieve the needed illumination to satisfy FAA standards for conspicuity. Thus, our invention uniquely fulfills the objective of a low cost, simple, maintenance free installation to use with the present day-time aerial markers in order to achieve desired visibility both during the day and at night.

Our invention as further outlined in these specifications and claims fulfills our foregoing objectives of increasing night time visibility of high voltage lines in a simple, low cost manner. Obviously, mechanical changes within the guidelines established in our foregoing discussion could be made; therefore we do not wish to be limited to exact details, but only as to the spirit and purpose encompassed in these claims and specifications.

BRIEF STATEMENT OF THE INVENTION

A first preferred embodiment designed to be clamped to a high voltage transmission line in the usual manner for daytime aerial markers comprises:

1. a split spherical colored fiber glass shell with projections on each half of the split shell designed to be used for clamping the shell to the line;

2. conductive strips embedded within the shell which may cover the major portion of the shell interior (a commercially available product which is a mat of conductive fibers called ROMOGLAS may be conveniently used); however, metallic rods or screens either embedded or fitting closely to the shell could also be used; the metallic conductors within the sphere are themselves connected but are insulated from the high voltage source; this may be conveniently accomplished by the configuration within the sphere;

3. one or more sets of neon lamps exterior to the upper half of the shell with each set almost encircling the shell and with each tube within the set electrically connected in series; the sets then electrically connected in parallel with one side of the parallel connection electrically connected with the high voltage source and the other side connected with the conductive area within the shell; all connections may be made within the shell with openings for the connectors sealed with a plastic sealer.

We have found that up to eight 27" neon tubes hooked in series in each of several sets and the sets then hooked in parallel, give excellent illumination with a continuously oscillating or dancing light when used with a 30" spherical capacitor and a 345,000 Volt high voltage source.

Reflective plastic strips embedded in the shell exterior under the neon lamps thereby increasing both daytime and nighttime visibility may also be used.

A second preferred embodiment made to install on an activated line using a "hot stick" was made essentially the same as the first embodiment by clamping the two halves of the shell around a metallic conductor with a "duckbill" type clamp to clamp on the wire on one end and female fitting to connect to a "hot stick" on the other. In this embodiment the neon lamps were arranged on the upper part of each half in order to give maximum visibility from above the unit. In other embodiments the sphere may be comprised of two or more segments with electrical insulation from each other to form separate capacitors.

We have found that lamps may dim during a heavy rain. This should be prevented by any of several modifications to keep dry the electrical connections and the electrical insulating area between the high voltage source and metallic conductive portion of the capacitor. All connections to the neon lamps may be made inside the spherical capacitor with openings to the exterior plastic sealed. A drip lip or gutter type extension to the shell should drain exterior water away from insulating areas between the high voltage source and the capacitor.

Many other embodiments of the invention could be visualized. Maximum illumination may be achieved by varying the length of the neon tubes in series, the number of these in parallel and the size of the capacitor. A spherical shape is not necessary for good illuminations but is preferred by FAA and gives a maximum capacitor for the space. Some experimentation may be necessary to achieve the most desireable lamping effects. For example, with a 30" spherical capacitor, a 138 KVA power source, 10 tubes two feet long spaced 4" apart on the upper half of the capacitor and with all tubes electrically connected in parallel there was very little light emitted because of cancellation of field effect. However, the same 10 tubes, placed ½" apart, connected electrically in parallel on the same size capacitor on the same 138 KVA line gave a brilliant oscillating light. In such an installation the multiple tubes provide for continued light emission even if some of the tubes fail, perhaps by breakage.

In some visualized embodiments the spherical shell may be ridged in such a fashion that the neon lamps may be clipped within the ridges or grooves and covered with transparent plastic to provide protection for the lamps. We have also demonstrated that excellent illumination is attained by connecting sets of tubes in series, with each set then connected in parallel and supported inside a transparent shell longitudinally below a high voltage line with one side of the parallel connection being hooked to the high voltage source and the other side to a spherical capacitor to give brilliant illumination of tubes. This configuration does not give an oscillating light.

Thus, many configurations of neon lamps or tubes hooked in series and/or in parallel between a high voltage source and a capacitor would come within the spirit and purpose of either my patent pending or the present invention.

BRIEF DESCRIPTION OF THE DRAWINGS

FIG. 1 shows an embodiment that would be most commonly used. The sphere halves 2 and 3 may be electrically insulated so as to have two capacitors with lamps 4 on both halves or could be electrically connected and have lamps 4 on either or both halves.

FIG. 2 is similar to FIG. 1 but adapted to mount on an energized high voltage line using a "hot stick". In this case a rain deflector 13 for the top connection and deflecting protrusions of the shell 14 may be used.

FIG. 3 is shown to illustrate flexibility of the invention. Note that gas filled lamps in enclosures 17 and 18 are mounted within the field of the high voltage source 1 but separated from the capacitor halves 2 and 3.

DETAILED DESCRIPTION OF THE DRAWINGS

FIG. 1 shows what is visualized to be the most commonly used form of the invention. The high voltage source 1 would usually be a transmission line. We've shown two halves of the capacitor 2 and 3. This capacitor is the size, shape and coloring of the present marker balls used for daytime visibility. The capacitor is usually fiberglass with a conductive inner layer covering most of the inner portion but leaving a sufficient area around the clamps to insulate the conductive inner layer from the high voltage source 1. The two halves 2 and 3 may be electrically insulated so that there are then two capacitors and gas filled lamps 4 may be used on both or the two halves 2 and 3 may be electrically connected to have one capacitor and gas filled lamps 4 used only on the top half 3 or only on the bottom half 2 or on both halves 2 and 3. Usually a reflective tape 6 would be used under the gas filled lamps 4. Note that the tape and lamps may be covered with a plastic shield or simply plastic coated. We have shown a simple clamp 5 which may be a metal clamp over protrusions of the halves of the shell 2 and 3. An electrical connection between one clamp 5 and high voltage source 1 effectively eliminates corona and failure of the shell therefrom. Spacing of the gas filled lamps 4 is such as to have capacitive coupling of the gas filled lamps 4 for maximum illumination. If the gas filled lamps 4 were evenly spaced over most of the exterior surface field cancellation effects would result in low level illumination.

FIG. 2 is quite similar to FIG. 1 but with the halves 8 and 9 which are somewhat different shape than 2 and 3, FIG. 1, clamped over a conductor 15 with clamps 5. Gas filled lamps 4 are mounted over reflective tape 6 in the same way as FIG. 1. The reflective tape 6 may be replaced with a reflective paint and is not necessary for operation but may increase visibility of the unit. A hook or clamp 12 may be a standard clamp suitable to pull on a high voltage source 1 and tighten in place. The threaded end 16 of the conductor is for use when the unit is hung on an energized high voltage source 1 using a "hot stick". We've shown a rain deflector 13 for the top clamp 5 and a ridged protrusion 14 to keep flowing water off the electrical connections through the other clamp 5.

FIG. 3 is shown to indicate versatility of configurations of the unit. Here, gas filled lamps are within clear enclosures 16 and 17 and are of a different shape and may be of different length than gas filled lamps 4. Their location at a distance from the spherical capacitor halves 2 and 3 does result in a non-oscillating light. Note that an electrode on one end of each gas filled lamp within enclosures 17 and 18 is electrically connected to the high voltage source 1 but each electrode in the other end of the gas filled lamps is electrically connected with the conductive area within the halves 2 and 3.

We claim:

1. An illuminated aerial marker comprising:
   A. an alternating current high voltage source,
   B. means comprise a bolted clamp on each side of said spherical shell to fasten two halves of an opaque spherical insulating shell with interior means to form a capacitor around said high voltage source to form a spherical capacitor, the following "said high voltage source is an electrical line and said interior means to form a capacitor is a conductive glass fiber mat integrally connected with said opaque spherical insulating shell"
   C. a plurality of gas filled lamps mounted in depressions of the exterior of said spherical capacitor with said plurality of gas filled lamps connected in series with an electrode on a beginning end of said series connected with said high voltage source line and an electrode on a terminal end of said series connected with said interior means to form a capacitor,
   D. proper spacing and sizing of said plurality of gas filled lamps to provide continuous light with nighttime conspicuity of as least 4,000 feet when said plurality of gas filled lamps is activated.

2. An illuminated aerial marker as in claim 1 wherein said plurality of gas filled lamps are mounted in depressions of the exterior of said spherical capacitor and are covered with a transparent material.

3. An illuminated aerial marker as in claim 1 further comprising means to waterproof the interior of said spherical capacitor and exterior electrical connections.

4. An illuminated aerial marker as in claim 1 where said high voltage source comprises a metallic conductor equipped with a clamp on one end, said clamp being so designed as to hang over an electrical line and a female threaded connector on the other end designed so that a threaded means may be used to install said aerial marker and where said means to fasten said two halves of said opaque spherical shell to said metallic conductor comprises a bolted clamp on each side of said opaque spherical shell.

5. An illuminated aerial marker comprising:
   A. means comprise a bolted clamp on each side of said spherical shell to fasten two halves of an opaque spherical, insulating shell around a high voltage source,
   B. a conductive means closely adjacent to the inside of said said two halves of said opaque spherical insulating shell thereby forming a spherical capacitor when said two halves are fastened around said high voltage source, said high voltage source is an electrical line and said interior means to form a capacitor is a conductive glass fiber mat integrally connected with said opaque spherical insulating shell
   C. a plurality of gas filled lamps mounted in depressions of the exterior of said spherical capacitor with portions of said plurality of gas filled lamps connected in parallel and said portions electrically connected in series with a beginning electrode of said plurality of gas filled lamps connected with said high voltage source and with a terminating electrode of said plurality of gas filled lamps electrically connected with said conductive means closely adjacent to the inside of said two halves of said opaque spherical shell forming a spherical capacitor,
   D. proper spacing and sizing of said plurality of gas filled lamps to provide a continuously flashing light with nightime visibility of a least 4,000 feet when said plurality of gas filled lamps is activated.

* * * * *